United States Patent
Chen

(10) Patent No.: US 9,183,726 B1
(45) Date of Patent: Nov. 10, 2015

(54) DIGITAL MEASURING DEVICE

(71) Applicant: Chiang-Kao Chen, New Taipei (TW)

(72) Inventor: Chiang-Kao Chen, New Taipei (TW)

( * ) Notice: Subject to any disclaimer, the term of this patent is extended or adjusted under 35 U.S.C. 154(b) by 28 days.

(21) Appl. No.: 14/266,978

(22) Filed: May 1, 2014

(51) Int. Cl.
| | |
|---|---|
| *G08B 21/00* | (2006.01) |
| *G08B 21/18* | (2006.01) |
| *B60C 23/04* | (2006.01) |
| *B60C 29/06* | (2006.01) |
| *B60C 25/00* | (2006.01) |

(52) U.S. Cl.
CPC .......... *G08B 21/182* (2013.01); *B60C 23/0447* (2013.01); *B60C 23/0496* (2013.01); *B60C 25/00* (2013.01); *B60C 29/06* (2013.01); *Y10T 29/53591* (2015.01)

(58) Field of Classification Search
CPC ........ B60C 25/00; B60C 23/06; B60C 29/00; G01B 5/18; Y10T 29/53591
USPC ............ 340/665, 442, 445; 141/38; 29/221.6; 73/146.8; 137/234.5
See application file for complete search history.

(56) References Cited

U.S. PATENT DOCUMENTS

| | | | | | |
|---|---|---|---|---|---|
| 3,568,708 | A | * | 3/1971 | Ashman | ...................... 137/234.5 |
| 4,097,075 | A | * | 6/1978 | Clayton | ...................... 285/332.3 |
| 4,526,030 | A | * | 7/1985 | Vecera, Jr. | ................... 73/146.8 |
| 8,726,476 | B2 | * | 5/2014 | Renaker et al. | .............. 29/221.5 |
| 2008/0127472 | A1 | * | 6/2008 | Whitehead et al. | .......... 29/221.5 |
| 2013/0333769 | A1 | | 12/2013 | Zalzalah | |

FOREIGN PATENT DOCUMENTS

| | | |
|---|---|---|
| FR | 2880295 | 5/2005 |
| TW | M240369 | 6/2003 |
| TW | M341613 | 2/2008 |
| TW | M464346 | 2/2013 |
| TW | M469205 | 8/2013 |
| WO | 2005/115685 | 8/2005 |

* cited by examiner

*Primary Examiner* — John A Tweel, Jr.
(74) *Attorney, Agent, or Firm* — Rosenberg, Klein & Lee

(57) ABSTRACT

A digital measuring device includes a housing, at least one measuring head, at least one measuring sensor, at least one digital measurement circuit, and at least one power supply unit. The measuring head is arranged outside the housing. The measuring head functions to carry out an operation of tightening a tire valve core, connecting a valve stem, or measuring tire tread. The measuring sensor is arranged inside the housing and coupled to the measuring head to measure and detect a detection signal indicating an output of a tire valve core tightening torque, a tire pressure, or a tire tread depth. The digital measurement circuit is connected to the measuring sensor for computing, displaying, and issuing an alarm regarding the tightening torque that the measuring head applies to tighten a tire valve core, the tire pressure, or the tire tread depth. The power supply unit supplies a desired direct-current working power to the measuring sensor and the digital measurement circuit. As such, a device that is capable of digital measurement, displaying, and issuing an alarm regarding the tire valve core tightening torque, the tire pressure, or the tire tread depth is formed.

13 Claims, 11 Drawing Sheets

DIGITAL MEASURING DEVICE

BACKGROUND OF THE INVENTION

1. Field of the Invention

The present invention relates to a digital measuring device, and in particular to a measuring device applicable to digital measurement of a torque for tightening a tire valve core, a tire pressure, or a tire tread depth and having functions of digital computation, displaying, and alarm issuing.

2. The Related Arts

A conventional tire valve stem comprises a valve core, which is a core and a vital component of the tire valve stem and is often mounted and dismounted by applying an assembling/disassembling tool. In using a known assembling/disassembling tool to mount/dismount a valve core, if the torque used to carry out a loosening or tightening operation is not properly controlled, a potential risk of air leaking from a tire or damaging the tire valve stem may result. For example, when the valve core assembling/disassembling tool does not apply a sufficient torque to mount and securely fix a valve stem, air leaking from the tire may occur later. If the valve core assembling/disassembling tool applies an excessive torque to mount a valve stem and makes the valve stem over-tightened, the thread of the valve core and the valve stem may undergo excessive abrasion and may get broken, leading to an undesired situation of replacing the entire valve stem. Similar problems of excessive abrasion or breaking of the threads of the valve core and valve stem may also occur in dismounting the valve core using the valve core assembling/disassembling tool.

Prior art documents in this field are known, such as Taiwan Utility Models M469205, which discloses a valve stem removing tool; M464346, which discloses an improved structure of a tool for removing a valve stem of a tire; M341613, which discloses a valve core removing member for mounting/dismounting an internal valve component of a tire valve stem; M340369, which discloses a pulling device for tire valve stem; US Patent Publication No. 2013333769, which discloses a "combination tire valve core removal and fluid fill tool"; PCT application No. WO2005115685, which discloses a "universal vehicle tire valve core and cap removal and installation tool", and French patent application No. 2880295, which discloses an inflatable tire's valve core dismounting tool, which has a dismounting unit comprising a rod with a pin that is supported against an extension of a plug when a core is released, where the extension extends within a body comprising a filtering unit and perforations. These prior art documents discloses various types or typical arrangements of known valve stem mounting/dismounting tool. However, these devices or tools all suffer the same long-existing problems and drawbacks of the prior art that when the device or tool is used by a user to mount or dismount a valve stem, it may potentially have the valve stem under-tightened, leading to a potential risk of air leaking, or it may have the valve stem over-tightened, leading to excessive abrasion or even breaking of the threads of the valve core and valve stem, making it necessary to replace the entire tire valve stem.

SUMMARY OF THE INVENTION

Those conventional tire valve stem assembling/disassembling tools or those tire valve stem assembling/disassembling tools available from the above named patent documents, when used to carry out an operation of screwing and mounting a valve core in a tire valve stem, does not provide precise measurement, alarm, and control of torque and consequently may result in under-tightening of the valve core of the tire valve stem and thus air leaking; or may have the valve core over-tightened, leading to excessive abrasion and breaking of the threads of the valve cores and the valve stem, making it necessary to replace the entire valve stem.

Thus, the present invention provides a digital measuring device, which comprises:

a housing;

at least one valve core measuring head, which is arranged outside the housing, the measuring head being adapted to carry out an operation of tightening a tire valve core;

at least one valve core tightening torque measuring sensor, which is arranged in the housing and coupled to the measuring head to measure and detect a detection signal indicating an output of a tire valve core tightening torque;

at least one digital measurement circuit, which is connected to the valve core tightening torque measuring sensor for computing, displaying, and issuing an alarm regarding the tightening torque that the measuring head applies to tighten the tire valve core; and at least one power supply unit, which supplies a desired direct-current working power to the digital measurement circuit.

Further, in the above-described digital measuring device according to the present invention, the valve core tightening torque measuring sensor comprises a torque sensor.

Further, in the above-described digital measuring device according to the present invention, the digital measurement circuit comprises:

at least one analog-digital conversion circuit, which is connected to the valve core tightening torque measuring sensor to convert the detection signal of the valve core tightening torque into a digital signal for output;

at least one microprocessor, which is connected to the analog-digital conversion circuit to receive the valve core tightening torque digital signal supplied from the analog-digital conversion circuit for computing and processing the valve core tightening torque and provide outputs for displaying the valve core tightening torque and issuing the alarm;

at least one pushbutton set, which comprises a plurality of pushbuttons connected to the microprocessor to be actuated for inputting a preset alarm threshold for the valve core tightening torque and supplying a display switching signal to the microprocessor;

at least one display screen, which is connected to the microprocessor to display the valve core tightening torque;

at least one status indicator, which is connected to the microprocessor to indicate if the valve core tightening torque is within a normal operation range; and at least one sound alarm unit, which is connected to the microprocessor to issue a sound as an alarm for value of the valve core tightening torque.

The present invention also provides a digital measuring device, which comprises:

a housing;

a valve core measuring head, which is arranged outside the housing, the valve core measuring head being adapted to carry out an operation of tightening a tire valve core;

a tire pressure measuring head, which is arranged outside the housing, the tire pressure measuring head being adapted to connect to a tire valve stem;

a tire tread depth measuring head, which is arranged outside the housing, the tire tread depth measuring head being adapted to carry out an operation of reaching into and contacting a tire tread;

a valve core tightening torque measuring sensor, which is arranged inside the housing and coupled to the valve core measuring head to measure and detect a detection signal indicating an output of a tire valve core tightening torque;

a tire pressure measuring sensor, which is arranged inside the housing and coupled to the tire pressure measuring head to measure and detect a detection signal indicating an output of a tire pressure;

a tire tread depth measuring sensor, which is arranged inside the housing and coupled to the tire tread depth measuring head to measure and detect a detection signal indicating an output of a tire tread depth;

at least one digital measurement circuit, which is arranged inside the housing and connected to the valve core tightening torque measuring sensor, the tire pressure measuring sensor, and the tire tread depth measuring sensor to computer, display, and issue alarms regarding the tightening torque that the valve core tightening torque measuring head applies to tighten a tire valve core, a tire pressure measured with the tire pressure measuring head, and a tire tread depth measured with the tire tread depth measuring head;

at least one wireless communication module, which is arranged inside the housing to connect with the digital measurement circuit to transmit the tire valve core tightening torque, the tire pressure, and the tire tread depth, in a wireless manner, to at least one electronic device; and at least one power supply unit, which is arranged inside the housing to supply desired direct-current working powers to the valve core tightening torque measuring sensor, the tire pressure measuring sensor, the tire tread depth measuring sensor, and the digital measurement circuit.

Further, in the above-described digital measuring device according to the present invention, the digital measurement circuit comprises:

three analog-digital conversion circuits, which are respectively connected to the valve core tightening torque measuring sensor, the tire pressure measuring sensor, and the tire tread depth measuring sensor to respectively convert the detection signals of the valve core tightening torque, the tire pressure, and the tire tread depth into digital signals for output;

at least one microprocessor, which is connected to the analog-digital conversion circuits to receive the valve core tightening torque, the tire pressure, and the tire tread depth the digital signal supplied from the analog-digital conversion circuits for computing and processing the valve core tightening torque, the tire pressure, and the tire tread depth and provide displaying and outputting of alarms in respect of values of the valve core tightening torque, the tire pressure, and the tire tread depth;

at least one pushbutton set, which is connected to the microprocessor to be actuated for inputting preset alarm thresholds for the valve core tightening torque, the tire pressure, and the tire tread depth and supplying a display switching signals to the microprocessor;

at least one display screen, which is connected to the microprocessor to display the valve core tightening torque, the tire pressure, and the tire tread depth;

at least one status indicator, which is connected to the microprocessor to indicate if the valve core tightening torque, the tire pressure, and the tire tread depth are respectively within normal operation ranges;

at least one sound alarm unit, which is connected to the microprocessor to issue sounds as alarms for the values of valve core tightening torque, the tire pressure, and the tire tread depth; and at least one vibration alarm unit, which is connected to the microprocessor to generate vibrating forces as alarms for the values of the valve core tightening torque, the tire pressure, and the tire tread depth.

In the above-described digital measuring device according to the present invention, the wireless communication module comprises a wireless Bluetooth communication module.

In the above-described digital measuring device according to the present invention, the wireless communication module comprises a wireless communication module configured with a Wi-Fi communication protocol.

The effectiveness of the digital measuring device according to the present invention is that a valve core measuring head is used as a device for carrying out an operation of tightening a valve core of a tire valve stem and a valve core tightening torque measuring sensor and a digital measurement circuit are used to achieve measurement, displaying, and issuing an alarm regarding the tightening torque of the valve core so as to allow a user to ensure preciseness of the torque and protection of the tire valve core with an operation of tightening the tire valve core, whereby the tire valve stem and the valve core do not suffer excessive abrasion and breaking of the threads thereof and the valve core can be mounted in a valve stem in an intact and secured manner. On the other hand, the digital measurement circuit can be coupled to measuring heads and measuring sensors for tire pressure and tire tread depth and a wireless communication module to allow the applications of the present invention to include displaying, alarming, and wireless transmission of the valve core tightening torque, the tire pressure, and the tire tread depth thereby achieving multiple functions of measuring parameters of tires.

BRIEF DESCRIPTION OF THE DRAWINGS

The present invention will be apparent to those skilled in the art by reading the following description of preferred embodiments thereof, with reference to the attached drawings, wherein.

DETAILED DESCRIPTION OF THE PREFERRED EMBODIMENTS

Figure 1:
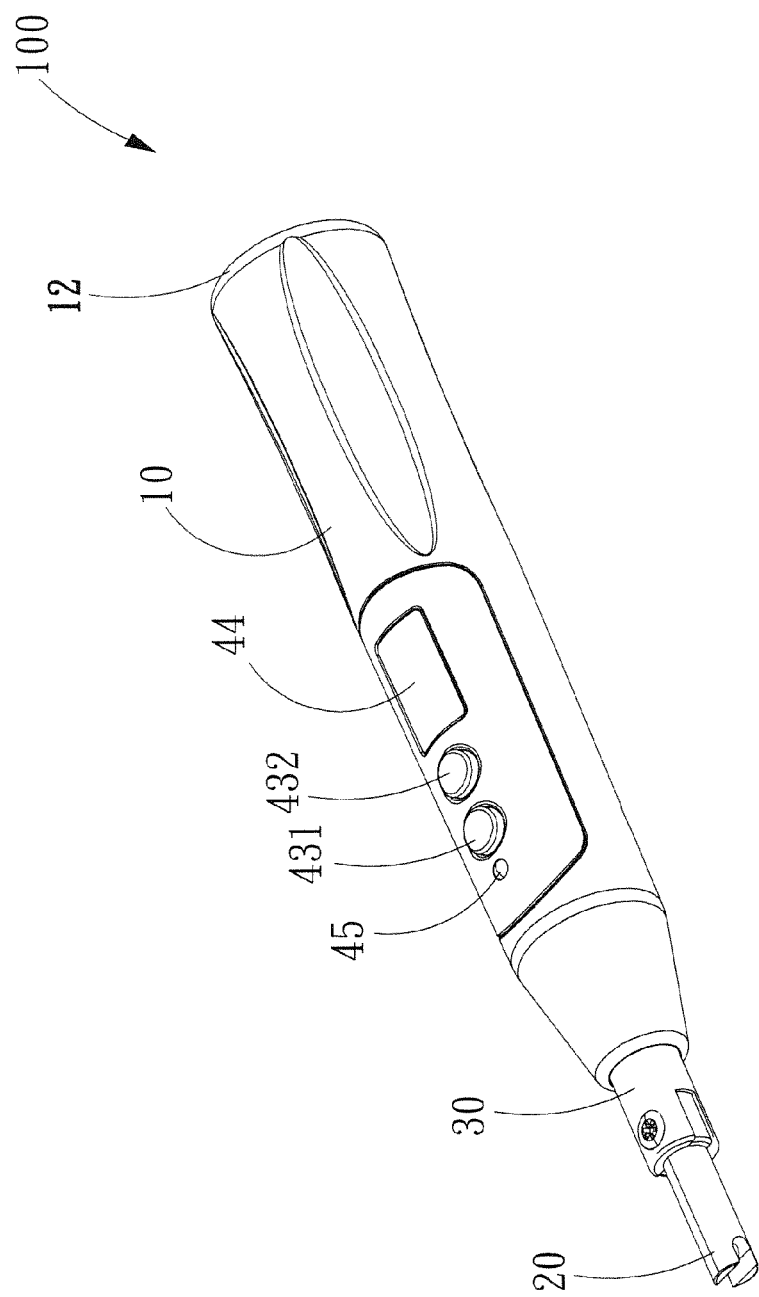
FIG. 1 is a perspective view showing a digital measuring device constructed in accordance with a first embodiment of the present invention.
Figure 2:
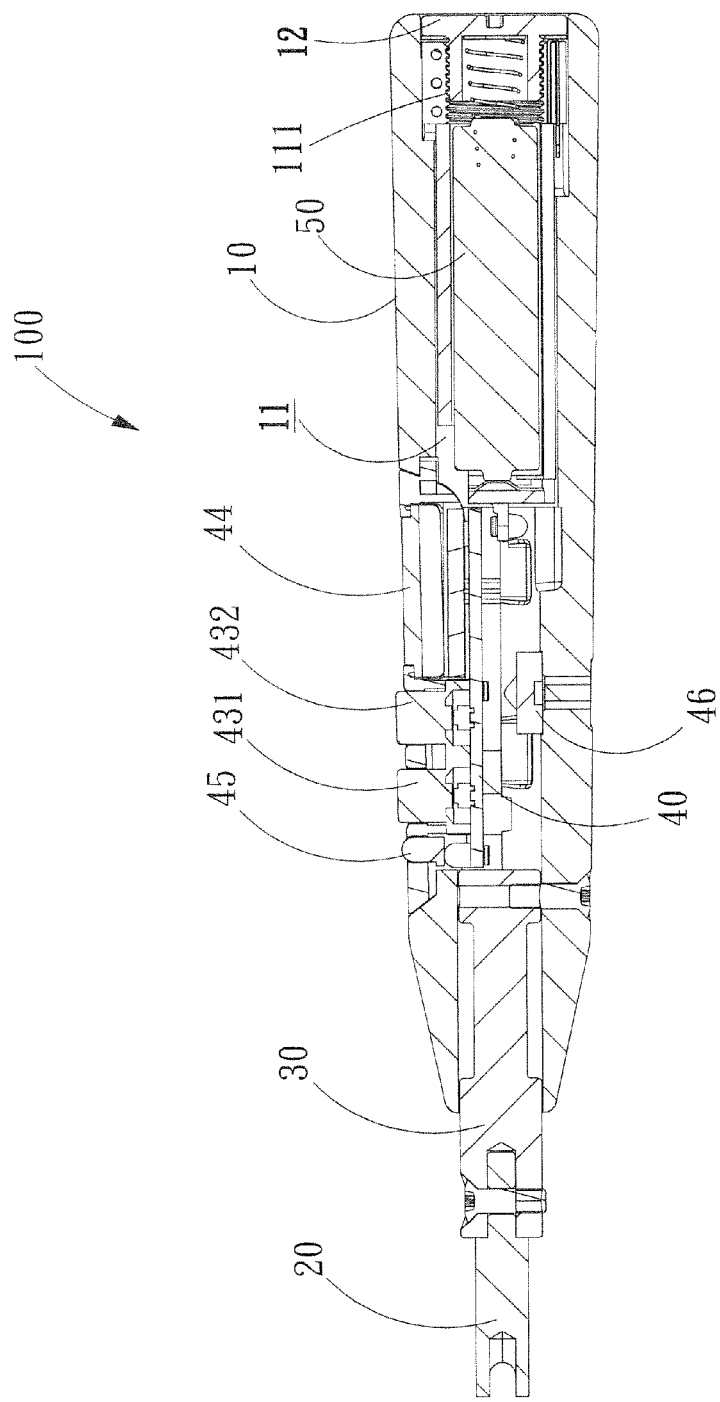
FIG. 2 is a cross-sectional view of FIG. 1.
Figure 3:
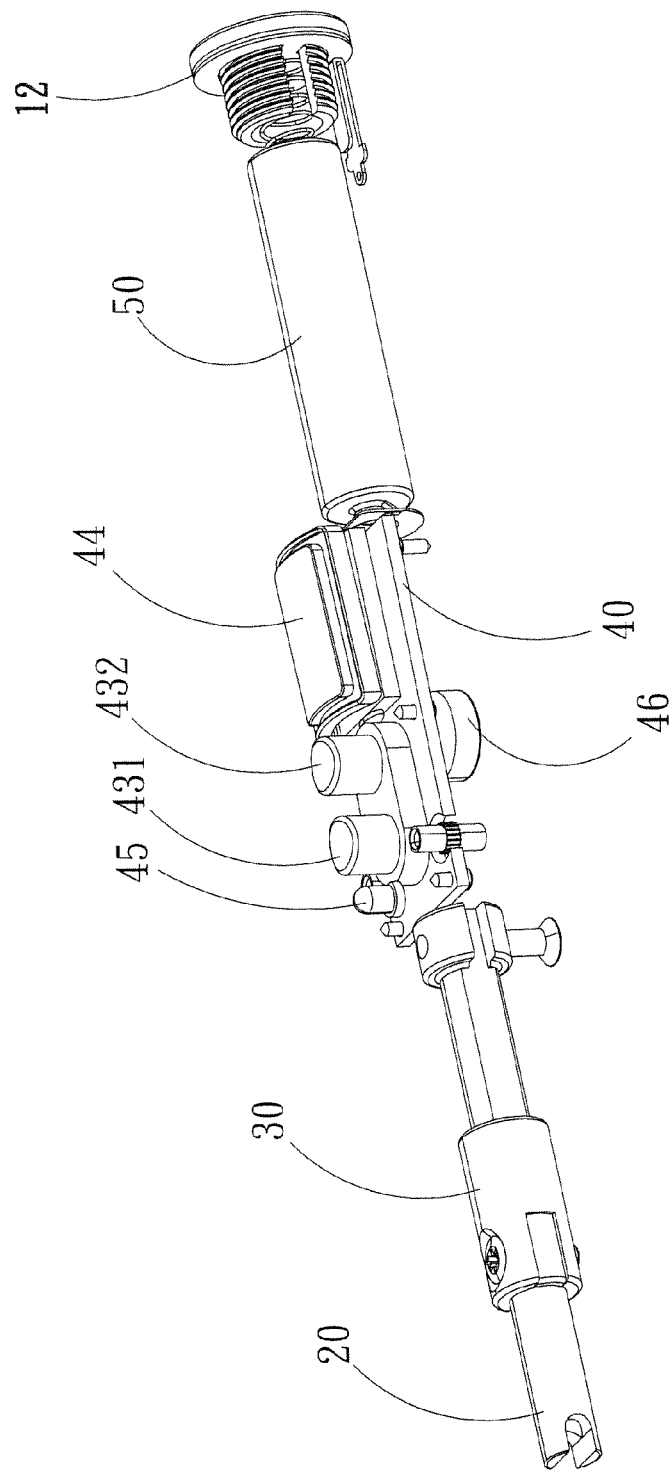
FIG. 3 is a perspective view showing a measuring head, a measuring sensor, a digital measurement circuit, and power supply unit of the digital measuring device of FIG. 2.
Figure 4:
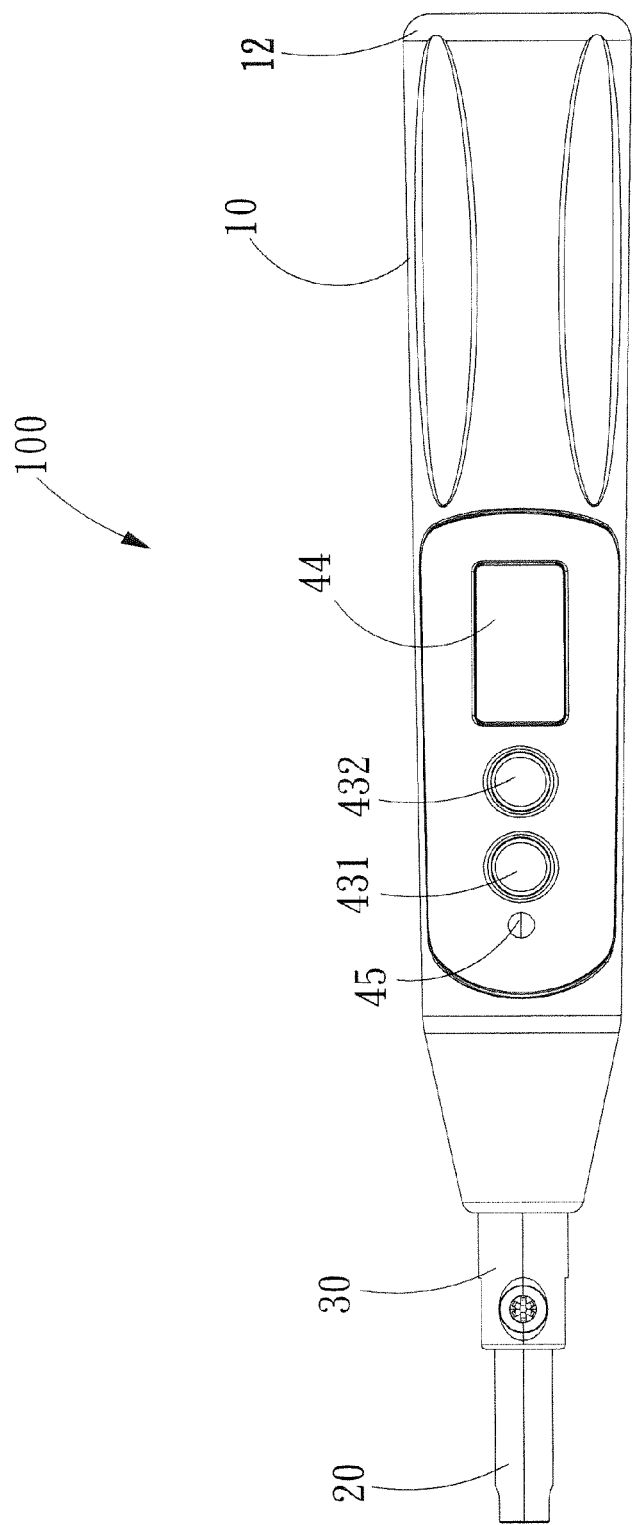
FIG. 4 is a top plan view of FIG. 1.

With reference to the drawings and in particular to FIGS. 1, 2, 3, and 4, a digital measuring device 100 constructed in accordance with a first embodiment of the present invention is shown. The digital measuring device 100 comprises a housing 10, which is not limited to any specific shape and configuration and is made in the form of a screwdriver handle in the first embodiment of the present invention. The housing 10 has a rear end in which a power compartment 11 is formed. The power compartment 11 has a rear end opening in which a thread 111 is formed for threadingly engaging with a closure cover 12 to close the power compartment 11.

At least one measuring head 20 is arranged externally of the housing 10. The measuring head 20 is configured as a tire valve core tightening tool for carrying out a tightening operation of a tire valve core.

At least one measuring sensor 30 is arranged inside the housing 10 and is coupled to the measuring head 20. The measuring sensor 30 comprises a torque sensor for measuring and outputting a detection signal 30a indicating a tightening torque of the tire valve core (as shown in FIG. 5).

Figure 5:
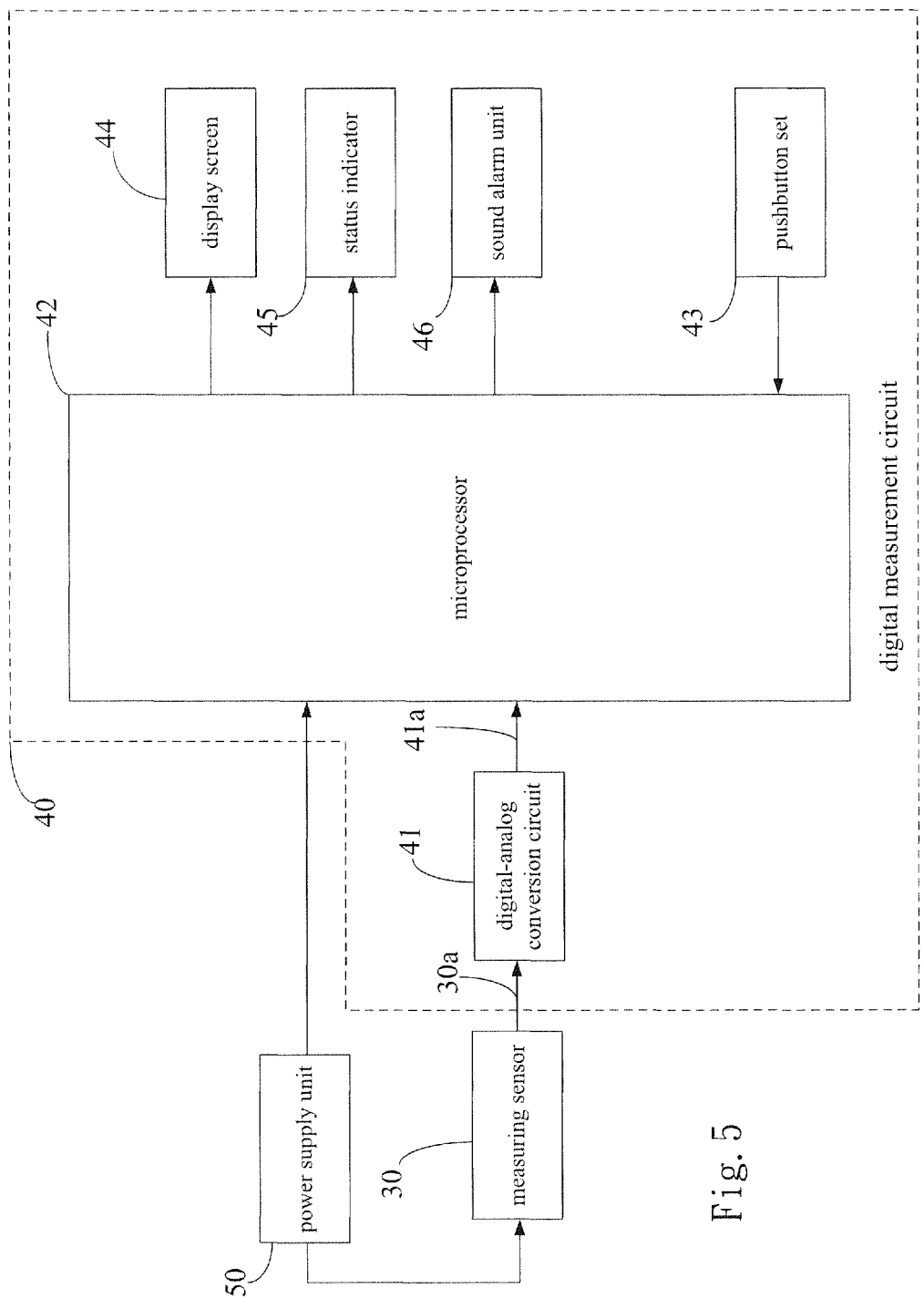
FIG. 5 is a block diagram of the digital measurement circuit of FIG. 2.
Figure 6:
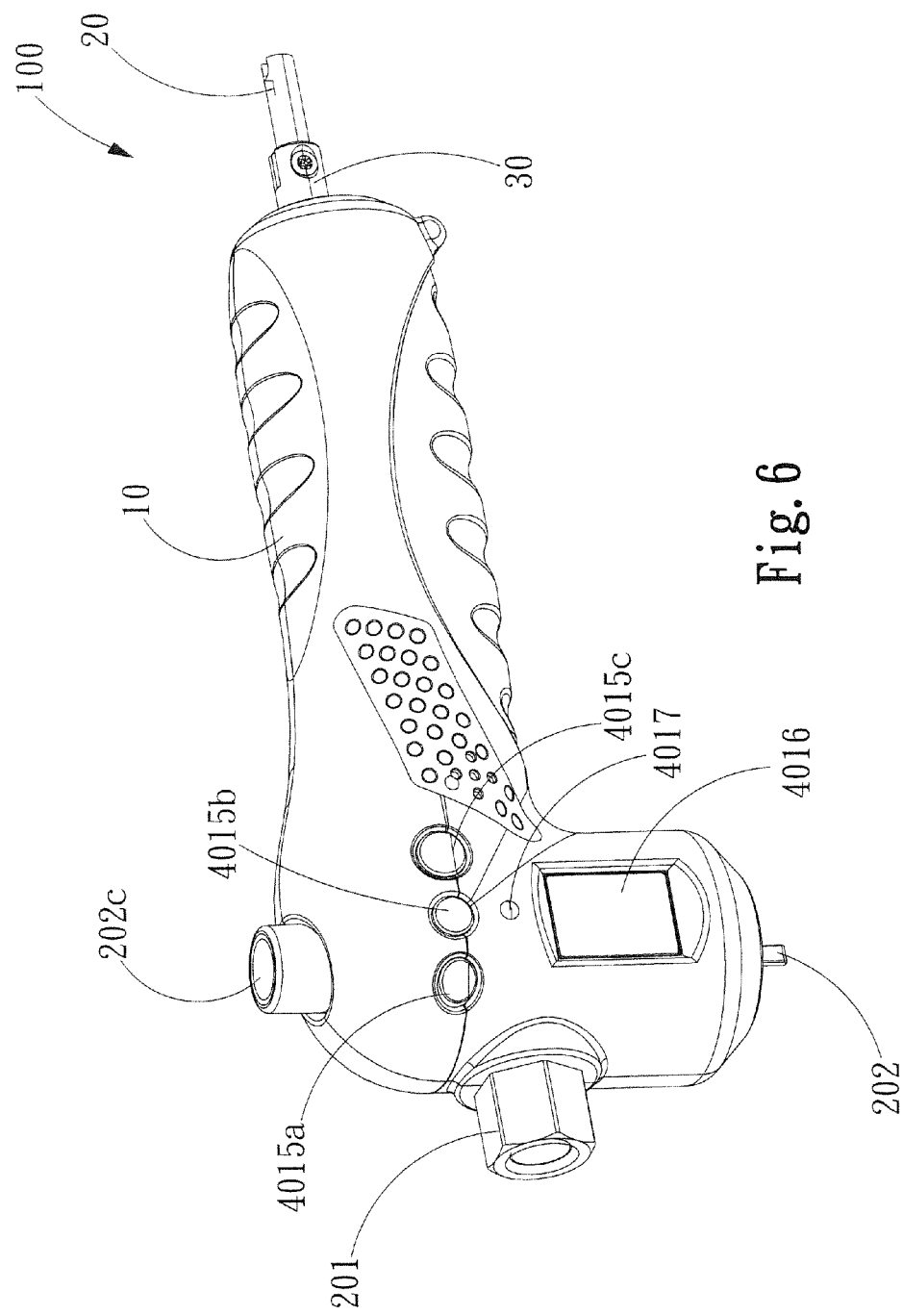
FIG. 6 is a perspective view showing a digital measuring device constructed in accordance with a second embodiment of the present invention.
Figure 7:
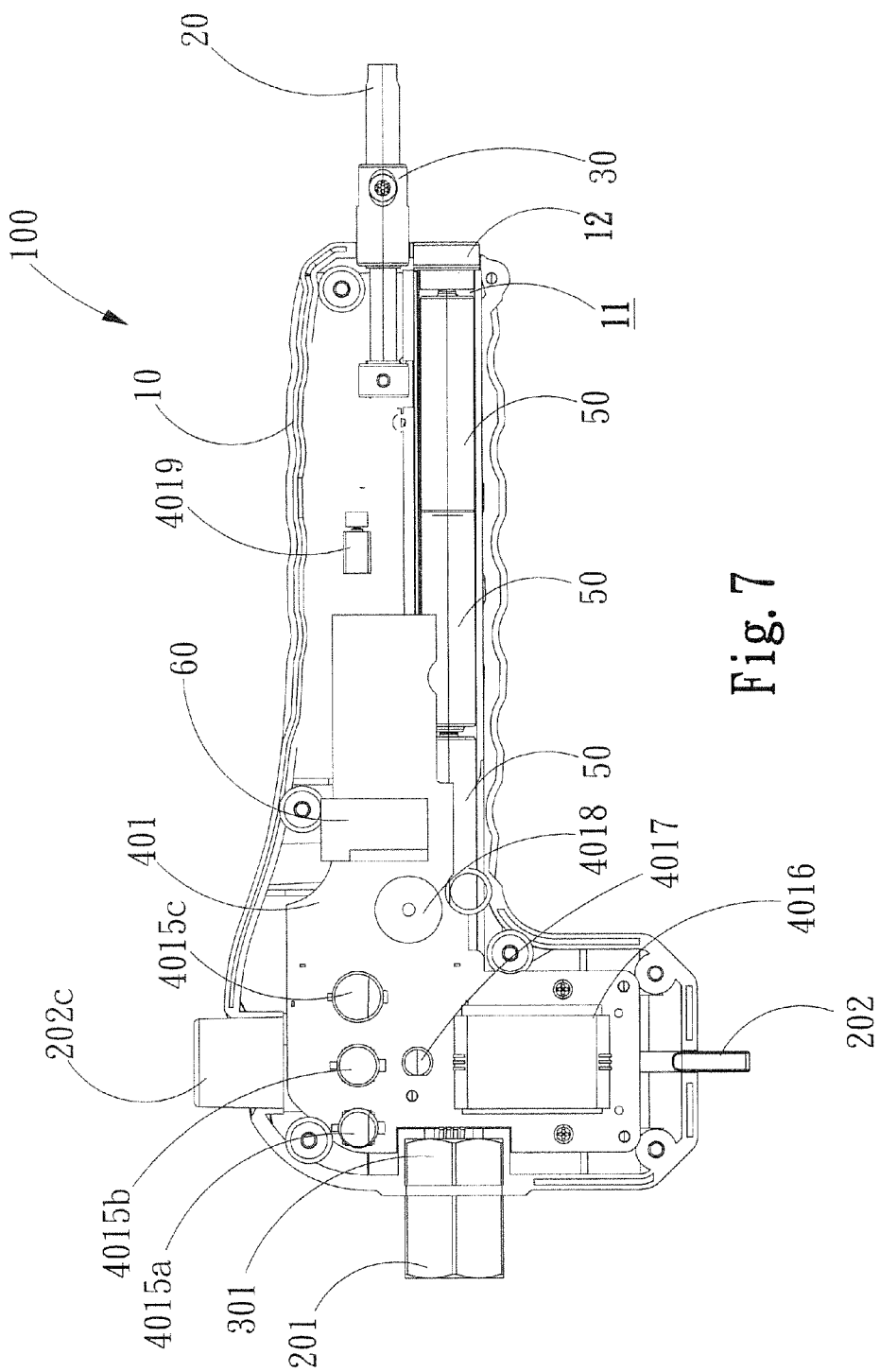
FIG. 7 is a cross-sectional view of FIG. 6.
Figure 8:
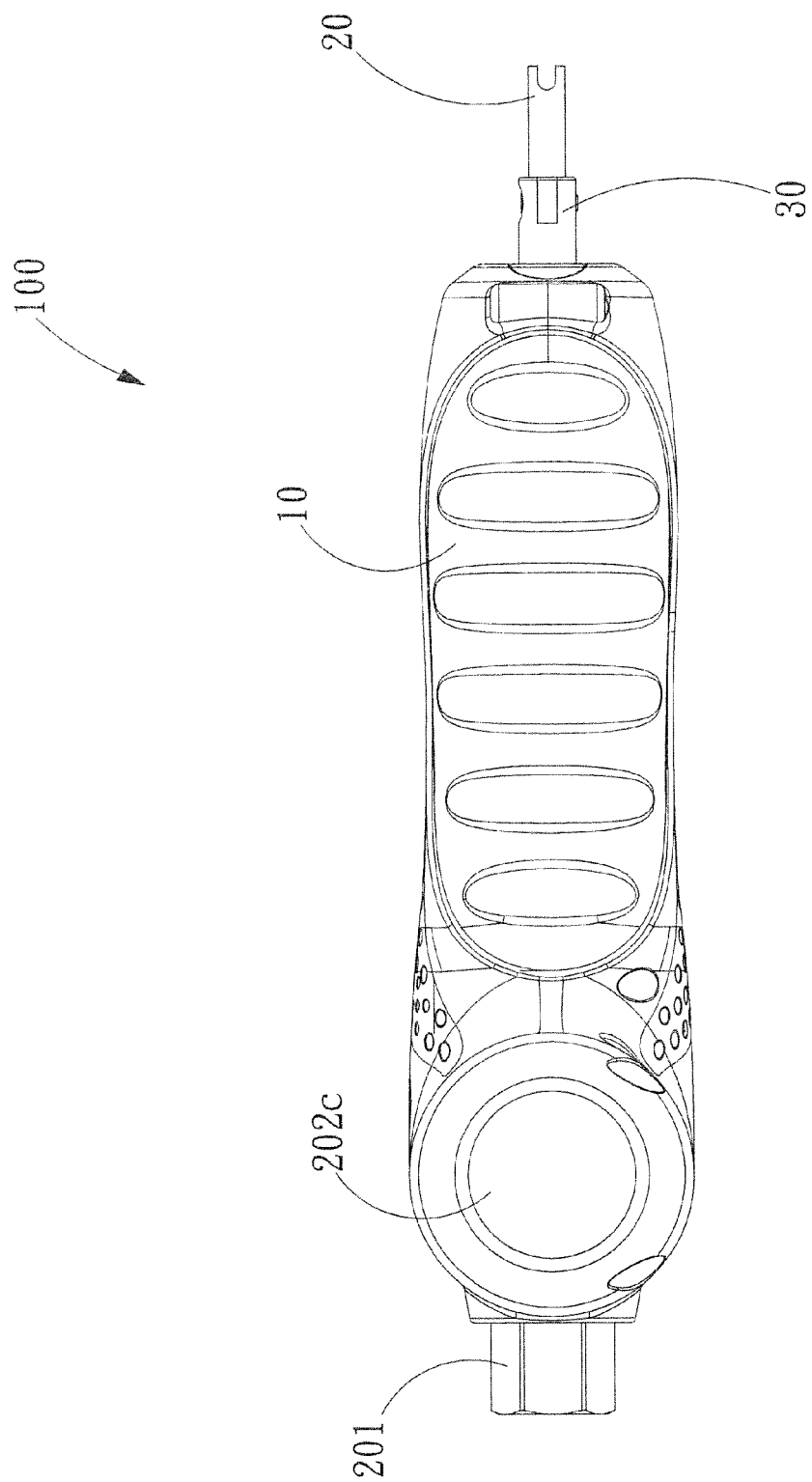
FIG. 8 is a top plan view of FIG. 6.
Figure 9:
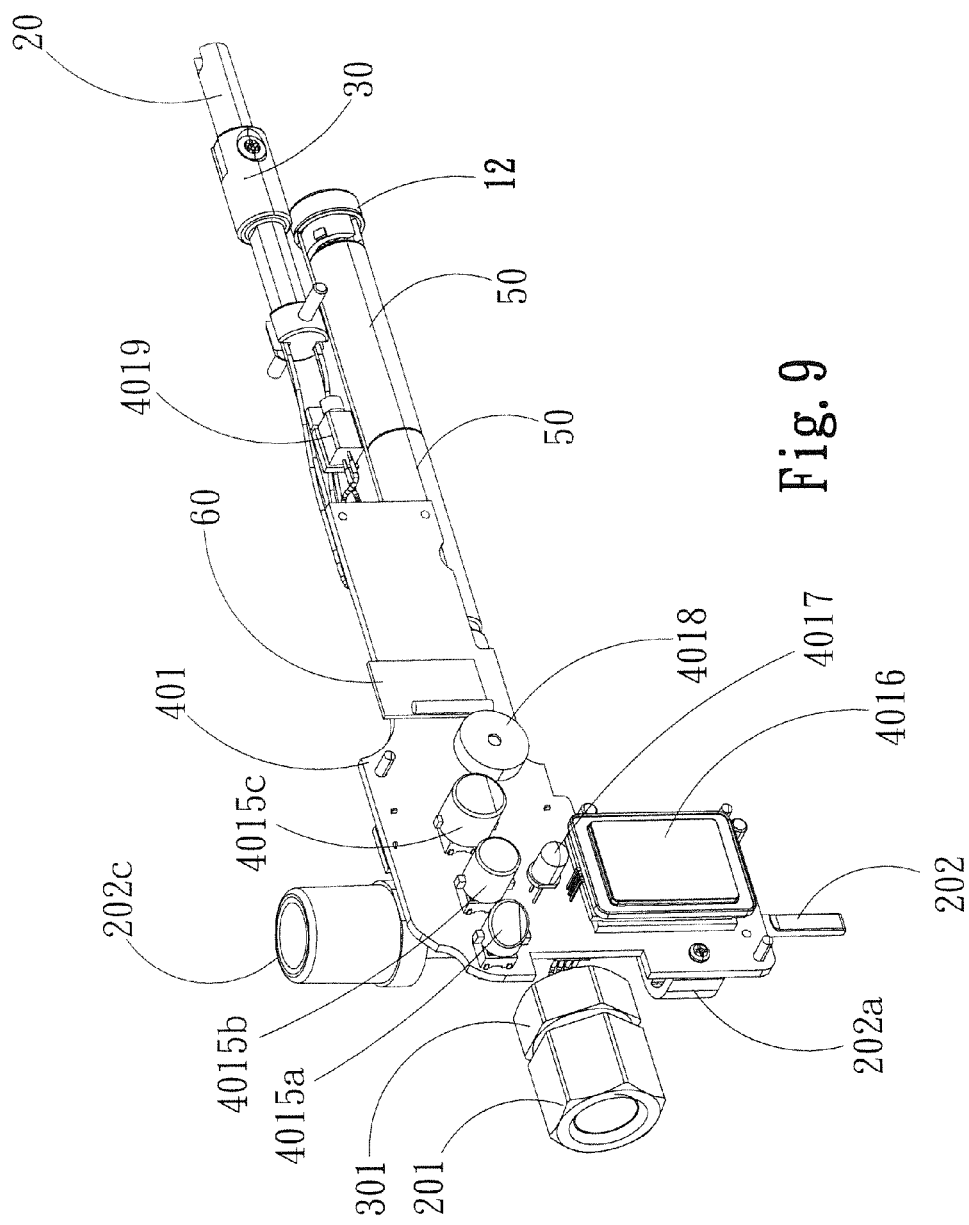
FIG. 9 is a perspective view showing a measuring head, a measuring sensor, a digital measurement circuit, and power supply unit of the digital measuring device of FIG. 6.
Figure 10:
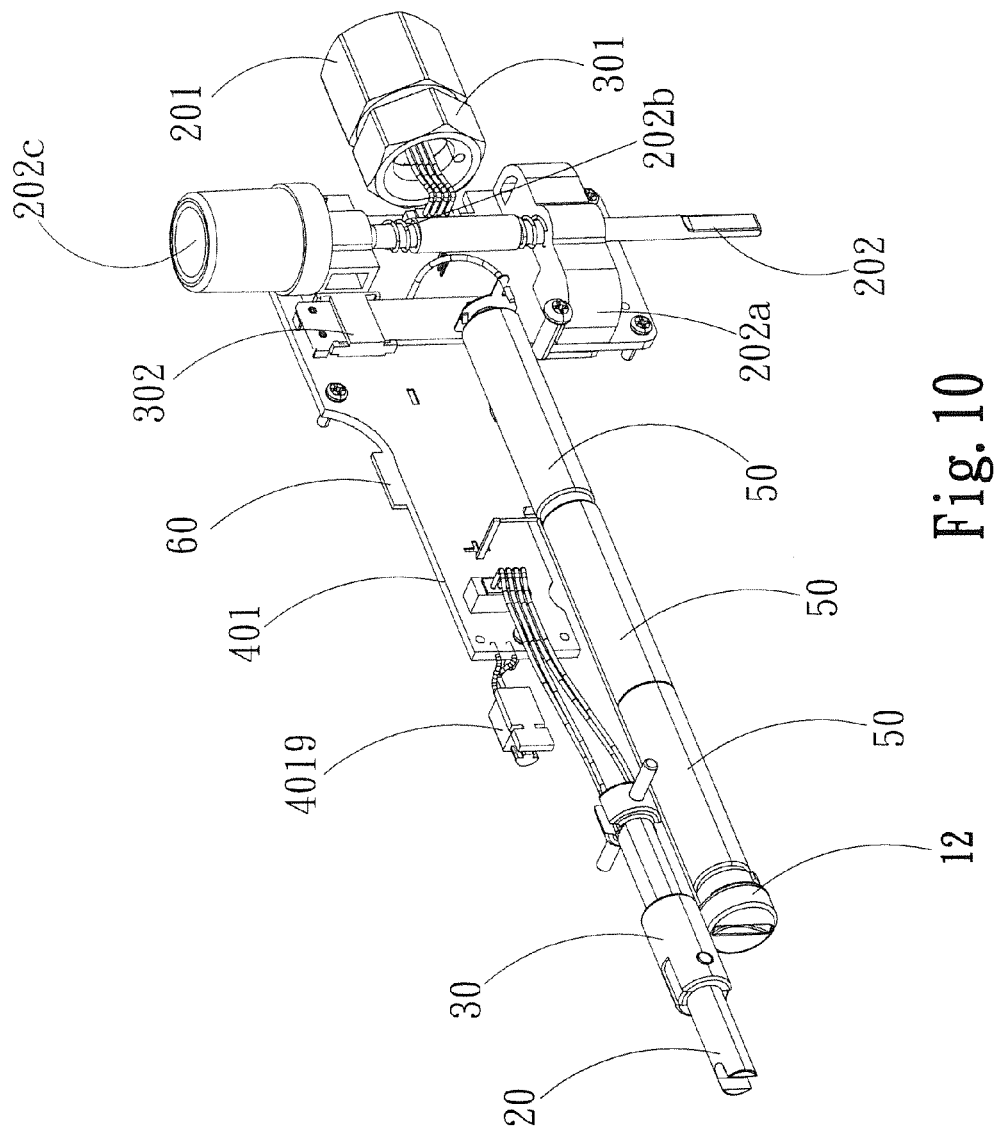
FIG. 10 is a different perspective view of FIG. 9.
Figure 11:
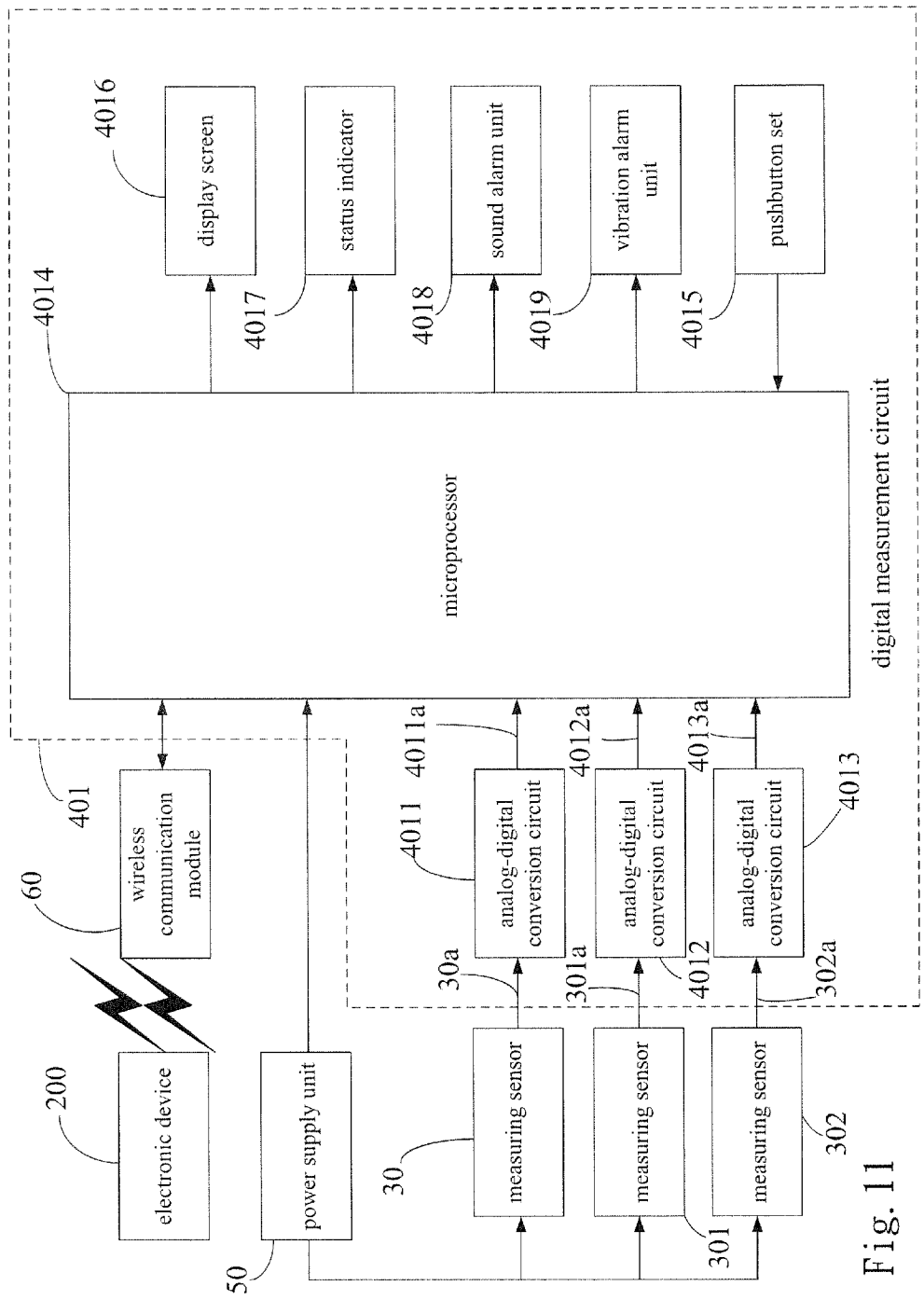
FIG. 11 is a block diagram of the digital measurement circuit of FIGS. 9 and 10.

Further referring to FIG. 5, at least one digital measurement circuit 40 is connected to the above described valve core tightening torque measuring sensor 30. The digital measurement circuit 40 is not limited to any specific form and in the first embodiment of the present invention is shown, as an illustrative example, comprising at least one analog-digital conversion circuit 41, at least one microprocessor 42, at least one pushbutton set 43, at least one display screen 44, at least one status indicator 45, and at least one sound alarm unit 46. The analog-digital conversion circuit 41 is connected to the valve core tightening torque measuring sensor 30 to convert the detection signal 30a of the tire valve core tightening torque into a digital signal 41a for output.

The microprocessor 42 is connected to the analog-digital conversion circuit 41 to receive the valve core tightening torque digital signal 41 supplied from the analog-digital conversion circuit 41 and to compute and process the valve core tightening torque value for providing displaying and outputting of an alarm in respect of the value of the valve core tightening torque.

The pushbutton set 43 comprises a plurality of pushbuttons 431, 432 connected to the microprocessor 42 to be actuated for inputting a preset alarm threshold for the valve core tightening torque and supplying a display switching signal to the microprocessor 42.

The display screen 44 is connected to the microprocessor 42 to display the torque value of tightening the valve core.

The status indicator 45 is connected to the microprocessor 42 to indicate if the valve core tightening torque is within a normal operation range. The status indicator 45 is not limited to any specific form and in the present invention, a light-emitting diode (LED) light is used as an example.

The sound alarm unit 46 is connected to the microprocessor 42 to issue a sound as an alarm for the value of the valve core tightening torque. The sound alarm unit 46 is not limited to any specific form and in the present invention, a buzzer is used as an example. Other equivalent sound alarm device, such as a speaker, may also be used and is considered within the scope of the present invention.

The digital measurement circuit 40 may function to compute, display, and issue an alarm regarding a tightening torque that the valve core measuring head 20 is applied to tighten a tire valve core.

At least one power supply unit 50 is received and retained in the power compartment 12 of the housing 10 to supply a desired direct-current working power to the measuring sensor 30 and the digital measurement circuit 40. The power supply unit 50 is not limited to any specific form and in the present invention, an electrical battery is used as an example.

Referring to FIGS. 6, 7, 8, 9, 10, and 11, a digital measuring device 100 according to a second embodiment of the present invention is shown. The housing 10 is made in the form of an L-shaped handle. Three measuring heads 20, 201, 202 are formed on and externally of the housing 10. The measuring heads 20, 201, 202 are respectively an operation head for carrying out a tightening operation of a tire valve core, an operation head for connection with a valve stem of a tire, and an operation head for reaching into and carrying out measurement of tire tread. The measuring head 202 has an end connected to a retention seat 202a, a spring 202b, and an operation button 202c to provide the measuring head 202 with extension elasticity for contacting and pressing, whereby through actuation or de-actuation of the operation button 202c, the measuring head 202 is extended or retracted for contacting and measuring the depth of the tire tread.

Three measuring sensors 30, 301, 302 are arranged inside the housing 10 and are respectively coupled to the measuring heads 20, 201, 202 for measuring and detecting a detection signal 30a indicating an output of a tire valve core tightening torque, measuring and detecting a detection signal 301a indicating an output of the tire pressure, and measuring and detecting a detection signal 302a indicating an output of tire tread depth. The tire pressure measuring sensor 301 is not limited to any specific form and in the present invention, a pressure sensor is used as an example. The tire tread depth measuring sensor 302 can be a displacement sensor or a photoelectrical sensor.

The digital measurement circuit 401 is arranged in the housing 10 and is connected to the valve core tightening torque measuring sensor 30, the tire pressure measuring sensor 301, and the tire tread depth measuring sensor 302. The digital measurement circuit 401 comprises three analog-digital conversion circuits 4011, 4012, 4013, at least one microprocessor 4014, at least one pushbutton set 4015, at least one display screen 4016, at least one status indicator 4017, at least one sound alarm unit 4018, and at least one vibration alarm unit 4019. The three analog-digital conversion circuits 4011, 4012, 4013 are respectively connected to the valve core tightening torque measuring sensor 30, the tire pressure measuring sensor 301, and the tire tread depth measuring sensor 302 for converting detection signals of a tire valve core tightening torque, a tire pressure, and a tire tread depth into three digital signals 4011a, 4012a, 4013a for output.

The microprocessor 4014 is connected to the analog-digital conversion circuits 4011, 4012, 4013 to receive the three digital signals 4011a, 4012a, 4013a of the valve core tightening torque, the tire pressure, and the tire tread depth supplied from the analog-digital conversion circuits 4011, 4012, 4013 for computing and processing the valve core tightening torque, the tire pressure, and the tire tread depth and providing displaying and outputting of alarms in respect of the values of the valve core tightening torque, the tire pressure, and the tire tread depth.

The pushbutton set 4015 comprises three pushbuttons 4015a, 4015b, 4015c connected to the microprocessor 4014 to be actuated for inputting preset alarm thresholds for the valve core tightening torque, the tire pressure, and the tire tread depth and supplying a display switching signal to the microprocessor 4014.

The display screen 4016 is connected to the microprocessor 4014 to display the valve core tightening torque, the tire pressure, and the tire tread depth. The display screen 4016 may comprise a liquid crystal display screen.

The status indicator 4017 is connected to the microprocessor 4014 to indicate if the valve core tightening torque, the tire pressure, and the tire tread depth are respectively within normal operation ranges. The status indicator 4017 may comprise an LED light.

The sound alarm unit 4018 is connected to the microprocessor 4014 to issue sounds as alarms for the values of valve core tightening torque, the tire pressure, and the tire tread depth. The sound alarm unit 4018 may comprise a buzzer.

The vibration alarm unit 4019 is connected to the microprocessor 4014 to generate vibrating forces as alarms for the values of the valve core tightening torque, the tire pressure, and the tire tread depth. The vibration alarm unit 4019 may comprise a vibration motor.

With the above arrangement, the digital measurement circuit 401 functions to compute, display, and issue alarms regarding a tightening torque that the valve core tightening torque measuring head 20 is applied to tighten a tire valve core, a tire pressure measured with the tire pressure measuring head 201, and a tire tread depth measured with the tire tread depth measuring head 202.

At least one wireless communication module 60 is arranged inside the housing 10 and is connected to the microprocessor 4014 of the digital measurement circuit 401 to transmit, in a wireless manner, the tire valve core tightening torque, the tire pressure, and the tire tread depth to at least one electronic device 200. The electronic device 200 is not limited to any specific form and can be for example a computer, a notebook computer, a tablet computer, and a mobile phone that has a function of wireless network connection and communication. The wireless communication module 60 is not limited to any specific form and comprises, in the present invention, a Bluetooth wireless communication module or a wireless communication module configured with Wi-Fi wireless communication protocol.

At least one power supply unit 50 is received and retained in the power compartment 11 of the housing 10 to supply desired direct-current working powers to the valve core tightening torque measuring sensor 30, the tire pressure measuring sensor 301, the tire tread depth measuring sensor 302, and the digital measurement circuit 401. The power supply unit 50 may comprise an electrical battery.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A digital measuring device, comprising:
   a housing;
   at least one valve core measuring head, which is arranged outside the housing, the measuring head being adapted to carry out an operation of tightening a tire valve core;
   at least one valve core tightening torque measuring sensor, which is arranged in the housing and coupled to the measuring head to measure and detect a detection signal indicating an output of a tire valve core tightening torque;
   at least one digital measurement circuit, which is connected to the valve core tightening torque measuring sensor for computing, displaying, and issuing an alarm regarding the tightening torque that the measuring head applies to tighten the tire valve core; and
   at least one power supply unit, which supplies a desired direct-current working power to the digital measurement circuit.

2. The digital measuring device as claimed in claim 1, wherein the housing has a rear end in which a power compartment is formed, the power compartment receiving and retaining therein the power supply unit, the power compartment having a rear end opening in which a thread is formed for threadingly engaging a closure cover for closing the power compartment.

3. The digital measuring device as claimed in claim 1, wherein the digital measurement circuit comprises:
   at least one analog-digital conversion circuit, which is connected to the valve core tightening torque measuring sensor to convert the detection signal of the valve core tightening torque into a digital signal for output;
   at least one microprocessor, which is connected to the analog-digital conversion circuit to receive the valve core tightening torque digital signal supplied from the analog-digital conversion circuit for computing and processing the valve core tightening torque and provide outputs for displaying the valve core tightening torque and issuing the alarm;
   at least one pushbutton set, which comprises a plurality of pushbuttons connected to the microprocessor to be actuated for inputting a preset alarm threshold for the valve core tightening torque and supplying a display switching signal to the microprocessor;
   at least one display screen, which is connected to the microprocessor to display the valve core tightening torque;
   at least one status indicator, which is connected to the microprocessor to indicate if the valve core tightening torque is within a normal operation range; and
   at least one sound alarm unit, which is connected to the microprocessor to issue a sound as an alarm for value of the valve core tightening torque.

4. A digital measuring device, comprising:
   a housing;
   a valve core measuring head, which is arranged outside the housing, the valve core measuring head being adapted to carry out an operation of tightening a tire valve core;
   a tire pressure measuring head, which is arranged outside the housing, the tire pressure measuring head being adapted to connect to a tire valve stem;
   a tire tread depth measuring head, which is arranged outside the housing, the tire tread depth measuring head being adapted to carry out an operation of reaching into and contacting a tire tread;
   a valve core tightening torque measuring sensor, which is arranged inside the housing and coupled to the valve core measuring head to measure and detect a detection signal indicating an output of a tire valve core tightening torque;
   a tire pressure measuring sensor, which is arranged inside the housing and coupled to the tire pressure measuring head to measure and detect a detection signal indicating an output of a tire pressure;
   a tire tread depth measuring sensor, which is arranged inside the housing and coupled to the tire tread depth measuring head to measure and detect a detection signal indicating an output of a tire tread depth;
   at least one digital measurement circuit, which is arranged inside the housing and connected to the valve core tightening torque measuring sensor, the tire pressure measuring sensor, and the tire tread depth measuring sensor to computer, display, and issue alarms regarding the tightening torque that the valve core tightening torque measuring head applies to tighten a tire valve core, a tire pressure measured with the tire pressure measuring head, and a tire tread depth measured with the tire tread depth measuring head;

at least one wireless communication module, which is arranged inside the housing to connect with the digital measurement circuit to transmit the tire valve core tightening torque, the tire pressure, and the tire tread depth, in a wireless manner, to at least one electronic device; and at least one power supply unit, which is arranged inside the housing to supply desired direct-current working powers to the valve core tightening torque measuring sensor, the tire pressure measuring sensor, the tire tread depth measuring sensor, and the digital measurement circuit.

5. The digital measuring device as claimed in claim 4, wherein the tire tread depth measuring head has an end connected to a retention seat, a spring, and an operation button to provide the measuring head with extension elasticity for contacting and pressing, whereby through actuation or de-actuation of the operation button, the measuring head is extended or retracted.

6. The digital measuring device as claimed in claim 4, wherein the digital measurement circuit comprises:

three analog-digital conversion circuits, which are respectively connected to the valve core tightening torque measuring sensor, the tire pressure measuring sensor, and the tire tread depth measuring sensor to respectively convert the detection signals of the valve core tightening torque, the tire pressure, and the tire tread depth into digital signals for output;

at least one microprocessor, which is connected to the analog-digital conversion circuits to receive the valve core tightening torque, the tire pressure, and the tire tread depth the digital signal supplied from the analog-digital conversion circuits for computing and processing the valve core tightening torque, the tire pressure, and the tire tread depth and provide displaying and outputting of alarms in respect of values of the valve core tightening torque, the tire pressure, and the tire tread depth;

at least one pushbutton set, which comprises a plurality of pushbuttons connected to the microprocessor to be actuated for inputting preset alarm thresholds for the valve core tightening torque, the tire pressure, and the tire tread depth and supplying a display switching signals to the microprocessor;

at least one display screen, which is connected to the microprocessor to display the valve core tightening torque, the tire pressure, and the tire tread depth;

at least one status indicator, which is connected to the microprocessor to indicate if the valve core tightening torque, the tire pressure, and the tire tread depth are respectively within normal operation ranges;

at least one sound alarm unit, which is connected to the microprocessor to issue sounds as alarms for the values of valve core tightening torque, the tire pressure, and the tire tread depth; and at least one vibration alarm unit, which is connected to the microprocessor to generate vibrating forces as alarms for the values of the valve core tightening torque, the tire pressure, and the tire tread depth.

7. The digital measuring device as claimed in claim 1, wherein the valve core tightening torque measuring sensor comprises a torque sensor.

8. The digital measuring device as claimed in claim 4, wherein the valve core tightening torque measuring sensor comprises a torque sensor.

9. The digital measuring device as claimed in claim 3, wherein the sound alarm unit comprises a buzzer.

10. The digital measuring device as claimed in claim 6, wherein the sound alarm unit comprises a buzzer.

11. The digital measuring device as claimed in claim 6, wherein the vibration alarm unit comprises a vibration motor.

12. The digital measuring device as claimed in claim 4, wherein the wireless communication module comprises a wireless Bluetooth communication module.

13. The digital measuring device as claimed in claim 4, wherein the wireless communication module comprises a wireless communication module configured with a Wi-Fi communication protocol.

\* \* \* \* \*